United States Patent Office 2,728,735
Patented Dec. 27, 1955

2,728,735

WAX COMPOSITION

Alvin P. Anderson, Woodcliff Lake, N. J., assignor to Shell Development Company, Emeryville, Calif., a corporation of Delaware No Drawing. Application December 29, 1951,
Serial No. 264,229

11 Claims. (Cl. 260—28.5)

This invention relates to improved wax compositions and more particularly is concerned with wax compositions possessing improved sealing strength and other properties.

Crystalline paraffin waxes have been used for the coating or impregnation of paper or other sheeting materials for the principal purpose of providing waterproofness and sealing means therefor. Numerous technical problems are involved in the production of such compositions. Coated or impregnated sheets are ordinarily not completely impervious to water or water vapors. The tensile strength and sealing strength of many wax-coated papers is not satisfactory. In order to improve the tensile strength, hydrocarbon polymers and especially polymeric olefins, such as polyethylene and polyisobutylene, have been added in amounts varying from a small fraction of 1% to as much as 40% by weight of the total composition. However, it has been found that the addition of polymers, such as polyethylene, often has the disadvantage of diminishing the sealing strength as well as increasing the water vapor permeability of the composition.

It is an object of the present invention to provide improved wax compositions. It is another object of this invention to provide improved wax-containing sheeted materials. It is a major object of this invention to improve the sealing strength of wax compositions. A further object comprises the provision of wax blends having improved properties but of relatively lower cost. Other objects will become apparent during the following discussion.

Now, in accordance with the present invention, it has been found that wax compositions comprising a major amount of normal paraffin hydrocarbon waxes having average melting points below about 150° F. are substantially improved by the presence of up to about 20% by weight each of a relatively high molecular weight polymeric olefin and of a crystalline paraffin wax having a melting point greater than about 165° F.

The present invention is particularly unexpected in view of the fact that the addition of the wax having a melting point greater than 165° F. (hereinafter referred to as high melting point wax) to ordinary paraffin wax in the absence of a polyolefin causes a reduction in sealing strength. Still in accordance with this invention it has been found that these compositions can be further improved by the presence of components designed to improve tensile strength and/or sealing strength such as microcrystalline wax, soaps or fatty acids with amphoteric metals, reaction products of base exchange clays with onium compounds, and mixtures of inorganic colloids with hydrophobic surface-active agents.

PARAFFIN WAXES

The major components of the present compositions comprise normal and isoparaffin hydrocarbon waxes usually derived from petroleum crude oils and having melting points within the usual range from about 110° F. to about 150° F., preferably between about 130° F. and 145° F. The paraffin waxes preferably predominate in normal paraffins and may comprise a single wax but ordinarily will be a mixture of relatively closely related paraffin waxes. These are usually obtained by well-known dewaxing procedures from waxy lubricating oils. In such procedures the general practice is to distill a broad lubricating oil fraction into a number of relatively narrow fractions, extract the aromatics and color bodies by clay percolation or by using solvents such as phenol or the like, and finally to dissolve the waxy lubricating oil in a solvent such as methylethyl ketone, methyl isobutyl ketone, acetone or mixtures thereof, with other materials such as benzene and the like and cooling the wax and oil solution to a predetermined level in order to cause crystallization of the wax components. The latter are removed by centrifuging or filtering and then may be purified by recrystallization or other well-known procedures. Preferably they contain less than about 2% by weight of contaminating oils and, still more preferably, less than about 1%.

In the present compositions these waxes are ordinarily present in amounts of at least 60% by weight of the essential three-component composition and usually in amounts greater than 80% by weight thereof. The exact proportion will, of course, vary with the specific use for which the final composition is intended.

HIGH MELTING PARAFFIN WAXES

The crystalline paraffin waxes referred to by this title are high molecular weight normal and isoparaffin hydrocarbons. The major criterion comprises the minimum melting point of these particular waxes, which must be at least 165° F., and, preferably, is higher than about 170° F. They may be obtained by various procedures from either heavy lubricating oil distillates or from residual wax-bearing fractions.

In obtaining these waxes from lubricating oil distillates, the following procedure may be employed: the crude oil, after being topped to remove light oil fractions for motor fuels and the like, is further distilled to give low and medium viscosity lubricating oil fractions and a high viscosity lubricating oil fraction, the latter having a Saybolt Universal viscosity at 210° F. of at least 75 seconds and usually between about 75 and 160 seconds. The high viscosity lubricating oil distillate (preferably after acid treatment and/or solvent extraction) is diluted with a solvent such as naphtha and chilled to about −25° F. to produce a precipitated wax leaving lubricating oil dissolved in the solvent. The precipitated wax may be removed by suitable means such as filter pressing. The wax so obtained (slack wax) has a melting point of about 130–160° F. and contains about 40–60% oil. It is dissolved in a suitable solvent, such as oleum spirits, and chilled to about 60–80° F. (preferably about 70° F.) to crystallize therefrom a paraffin wax having a melting point of at least 165° F. and generally above 170° F. Still higher melting point waxes may be obtained by recrystallization of this material. Crude oils from the Salt Creek Field of Wyoming, for example, contain a relatively high proportion of such waxes.

While these waxes may be obtained from lubricating oil distillates, a preferred source comprises residual oils obtained during the distillation of waxy lubricating oil fractions. In accordance with this preferred method a portion of the residual slack wax may be de-oiled such as by dissolving in solvents, including methylethyl ketone, benzene or toluene, using for example 5–8 volumes of solvent to one volume of wax at a solution temperature of about 110–160° F., preferably about 140° F., cooling the solution to a suitable temperature, such as 40–75° F., preferably about 60° F., to precipitate the waxes while leaving the oily components and a portion of the lower melting wax constituents dissolved in the solvent;

filtering the slurry at about 40–75° F., preferably about 60° F., and washing the wax with a further quantity of solvent to recover a "primary microcrystalline wax" having a melting point of about 150–170° F., usually about 160° F. (ASTM method D87–42). The "primary microcrystalline wax" is then segregated into two or more wax products by dissolving it in from about five to about ten, suitably about seven, volumes of a dewaxing solvent at a suitable elevated temperature to obtain a complete solution, chilling the solution to a temperature usually between about 85° and about 125° F., to precipitate substantially only the higher melting point waxes which are hard paraffin waxes of a highly crystalline character from the solution of the truly plastic microcrystalline waxes. By varying the filtration temperature, the melting point of the precipitated waxes may be controlled. The higher the filtration temperature the higher the melting point of the hard crystalline paraffin wax. Details of the latter process are described in a corresponding patent application, Serial No. 163,937, filed May 24, 1950, by Karekin G. Arabian, now U. S. Patent 2,668,140.

These high melting point waxes possess all of the characteristics, such as specific gravity refractive index and the like, to indicate that they are high molecular weight varieties of paraffin waxes having either a straight-chain or isoparaffin configuration. They are sharply distinguished from the microcrystalline or amorphous waxes in that the latter are naphthenic or highly branched in character and possess a plastic nature, as contrasted with the hard, brittle character of these high melting point paraffin waxes with which the present invention is concerned.

The high melting point wax is present in an amount of less than about 20% by weight of the total composition, and preferably is present in an amount less than 10%, usually between about 1 and about 6%; for use as a fibrous or cellulose sheet impregnating composition to produce wax paper, between about 2% and about 5% are sufficient especially if the wax has a melting point of at least 170° F. and preferably between 170 and 195° F. Maximum results with respect to sealing strength improvement are obtained by the use of a ratio between 0.1 and 1.0 (preferably 0.2–0.8) high melting point wax to polyolefin.

OLEFIN POLYMERS

The third essential component of the present compositions comprises one or more olefin polymers having molecular weights which may vary from about 1,000 to about 100,000. Ordinarily these will comprise polymers having average molecular weights of between about 5,000 and about 25,000 although the average may be as high as 50,000. Dependent upon the final use of the composition the olefin polymer may be of the synthetic rubber type, the waxy type or may be resinous or sticky solids. Typical polymers coming within the class of compounds contemplated include polyethylene, polypropylene, polybutene, polyisobutylene, copolymers of ethylene and propylene and mixtures of the above homopolymers or mixtures of copolymers thereof. Consequently, the polymers contemplated preferably comprise polymers of mono- or di-olefins having monomeric units of from two to about four carbon atoms.

The polyethylenes are preferred for use in the present compositions and those employed in the preparation of wax papers may be generally described as ethylene polymer waxes which are frangible solids as distinguished from tough rubberlike polymers. Ethylene polymer waxes are obtained, for example, by pyrolysis of the rubberlike solid ethylene polymers, such as those obtained according to U. S. Patent No. 2,153,553. The methods for the preparation of ethylene polymers of either a waxlike or rubbery character are well-known. Preferred materials have approximate average molecular weights between about 8,000 and 15,000 and melt between about 200 and 250° F. They have tensile strengths in the order of 800–2000 p. s. i. at 25° C. and ultimate elongations of 50–400% at 25° C.

While these polymers may be present in amounts up to 50% by weight of the composition, they are usually present in amounts of less than about 20% by weight of the essential 3-component composition and preferably of amounts less than about 10%. They may be added to the wax compositions in amounts as little as 0.05% for certain purposes but usually will be present in amounts between about 1% and about 10%, while optimum results are obtained for most purposes when using between about 2% and about 5% based on the total composition.

Summarizing the three essential ingredients to be employed in accordance with the above disclosures, the composition should contain at least about 60% by weight of ordinary crystalline paraffin wax having a melting point between about 110° and about 150° F. To this wax two ingredients must be added, namely, less than about 20% by weight each of a polymeric olefin having a molecular weight of at least 1,000 and a high melting point crystalline paraffin wax having a melting point of at least 165° F. The preferred compositions comprise those wherein at least 80% of the composition comprises a paraffin wax having a melting point less than about 145° F. and containing between about 2% and about 5% by weight each of polyethylene and of a crystalline paraffin wax having a melting point of between 170 and 195° F.

While these three essential constituents must be present, further improvements may be made by the addition of other ingredients.

ADDITIONAL INGREDIENTS

The above compositions may be modified and improved by the presence of additives designed especially to improve tensile strength or oxidation resistance. A number of diverse types of materials may be employed for either of these purposes. In improving the tensile strength of the present compositions it is preferred to add less than about 50% by weight of the final composition of materials such as microcrystalline waxes which are, for example, obtained as the plastic wax separated from the residual waxes treated as described above during the process for obtaining high melting point wax. Microcrystalline waxes are highly branched and/or naphthenic waxes and exhibit plastic properties, although a melting point can be obtained by prescribed methods.

Another class of substance suitable for improving tensile strength comprises soaps of higher aliphatic monocarboxylic acids, i. e. those having more than 12 carbon atoms, with amphoteric metals. These are preferably aluminum soaps but may comprise zinc, lead, tin, chromium or titanium soaps of saturated or unsaturated fatty acids, or of hydroxy fatty acids. Typical soaps include aluminum stearate, zinc oleate, tin linoleate, aluminum 12-hydroxy stearate and the like.

A special class of agents designed to improve the tensile strength of these compositions comprises the reaction products of clays with onium compounds. Preferred reaction products comprise those of bentonite or Hectorite with ammonium compounds bearing at least one hydrocarbon radical having greater than about twelve hydrocarbon atoms. However, the corresponding sulfonium, arsonium and stibonium compounds may be used as well. The "onium clays," suitable for this purpose are described in a patent to Hauser, U. S. Patent 2,531,427.

Still better results, with respect to tensile strength may be obtained by the combination of hydrophobic surface-active agents with inorganic amorphous colloids such as silica, magnesia, lime and the like. Typical surface-active agents comprise cationic materials such as high molecular weight amines, e. g. octadecyl amine; soaps, such as lead stearate; acids, such as oleic acid and similar substances having hydrophobic surface-active properties. The proportion of surface-active agent should be adjusted so that at least 80% of the surface area of the inorganic colloid bears a coating of the surface-active agent. Preferably the colloid has a surface area of at least 100 square meters per gram.

Antioxidants which may be employed are generally present in amounts less than about 1% by weight of the composition. These may be such substances as sulphur, alkylated phenols or natural antioxidants, such as obtained in the extraction of microcrystalline waxes. A typical phenol is 2,4-dimethyl-6-tertiary butyl phenol.

The optional additives described above (other than microcrystalline wax) are to be used in amounts less than about 5% by weight of the final composition.

As intimated hereinbefore, the combination of high melting point wax with a polyolefin in the present wax compositions results in a sealing strength higher than when either minor constituent is present in the absence of the other. The following data demonstrate this point: a crystalline paraffin wax having a melting point of about 139° F. is modified with a high melting paraffin wax having a melting point of about 180° F. Part of this mixture was modified by the presence of polyethylene having a molecular weight of about 12,000. The sealing strengths of the original wax and of the modified compositions were tested. Another composition to be tested comprises 139° F. melting point wax modified by the presence of the same polyethylene. It will be found that the blend containing both polyethylene and the high melting point wax has a sealing strength higher than any of the other blends and higher than the original unmodified 139° F. melting point wax. Moreover, it can be determined that the presence of only one of the minor additives causes a decrease in the sealing strength from that of the unmodified wax.

Further data to illustrate the principles of the present invention and the results obtained thereby comprise tests performed on four-component compositions as follows: a paraffin wax was modified with microcrystalline wax and, alternatively, by the addition of high melting point wax and/or polyethylene. The following data can be obtained on these blends:

Table I

| Blend | | | | Sealing Strength (strength of paper sealed) | | |
|---|---|---|---|---|---|---|
| Percent Paraffin Wax, 139° F. Melt. Point | Percent Microcrystalline Wax, 145° M. P. | Percent High M. P. Wax, 175° F. | Percent Polyethylene, 12,000 mol. wt. | At 218° F. | At 235° F. | At 253–260° F. |
| 63 | 37 | ------ | ------ | 64 | 57 | 72 |
| 60 | 35 | 0 | 5 | 42 | 59 | 70 |
| 60 | 35 | 2 | 3 | 78 | 80 | 79 |
| 60 | 35 | 5 | 0 | 52 | 64 | 41 |

Not only does the addition of high melting point wax exhibit a synergistic sealing strength effect with polyolefins in wax compositions, but it also shows a cooperative action with respect to water vapor permeability. The data given in Table II below exhibit the latter property.

Table II

| Blend, wt. percent | | | | Water Vapor Permeability, g/24 Hr/100 sq. in. Uncreased |
|---|---|---|---|---|
| 139° F. M. P. Paraffin Wax | 145° F. M. P. Micro. Wax | 180° F. M. P. Paraffin Wax | 12,000 mol. wt. Polyethylene | |
| 100 | ------ | ------ | ------ | 0.15 |
| 63 | 37 | ------ | ------ | 0.26 |
| 60 | 35 | ------ | 5 | 0.77 |
| 60 | 35 | 5 | ------ | 0.22 |
| 60 | 35 | 2 | 3 | 0.19 |

Evidence that polyolefins of various molecular weights are suitable for use in these wax compositions is found in the data contained in Table III below. These data show that polyethylene having a molecular weight of 7,000 was effectively combined with high melting point wax to improve the sealing strength of wax composition.

Table III

| Blend, wt. percent | | | | Socony-Vacuum Sealing Strength | |
|---|---|---|---|---|---|
| 139° F. M. P. Paraffin Wax | 145° F. M. P. Micro. Wax | 180° F. M. P. Paraffin Wax | 7,000 mol. wt. Polyethylene | 73° F | 50° F |
| 60 | 35 | 0 | 5 | 137/113 | 87/69 |
| 60 | 34.65 | 0.35 | 5 | 133/133 | 84/64 |
| 60 | 33.2 | 1.8 | 5 | 162/162 | 105/176 |
| 60 | 31.5 | 3.5 | 5 | 163/163 | 91/67 |
| 60 | 29.7 | 5.3 | 5 | 127/127 | 85/66 |

The "sealing strength" is a measure of the force in grams required to separate a one inch wide strip of sheet material which has been bonded together by means of a wax composition. It may be determined by use of a Soconmy-Vacuum seal tester or some similar device. In the present case cellophane is coated with 8–10 pounds of the wax composition per ream of cellophane. This coated sheet is then laminated to a second cellophane sheet under a tension of 1–3 lb./in. The two sheets are passed over heated rollers at a speed sufficient to enable the composition to melt to a degree necessary for proper bonding.

Strips one-inch wide and about 30 inches long are so prepared and heated at one end to separate the two sheets for insertion in the testing device. Standard test conditions are 73° F. and 50% relative humidity although other conditions may be employed.

I claim as my invention:

1. As a new composition of matter, a wax composition consisting essentially of between about 1% and about 20% by weight of a paraffin wax of crystalline structure having a melting point between about 165° F. and about 195° F. between about 0.05% and about 20% by weight of a polymerized olefin having a molecular weight greater than about 1,000 and at least 60% by weight of a paraffin hydrocarbon wax of a crystalline structure having a melting point between about 110° F. and about 150° F.

2. As a new composition of matter, a wax composition consisting essentially of between about 1% and about 20% by weight of a paraffin wax of crystalline structure having a melting point between about 165° F. and about 195° F. an amount between about 0.05% and about 10% by weight of a polymerized olefin having an average molecular weight of at least 5,000 and at least 60% by weight of a paraffin hydrocarbon wax of a crystalline structure having a melting point between about 110° F. and about 150° F.

3. As a new composition of matter, a wax composition consisting essentially of between about 1% and about 20% by weight of a paraffin hydrocarbon wax of crystalline structure having a melting point between about 165° F. and about 195° F. between about 2% and about 5% by weight of polyethylene having an average molecular weight greater than about 5,000, and at least 60% by weight of a paraffin hydrocarbon wax of a crystalline structure having a melting point between about 110° F. and about 150° F.

4. As a new composition of matter, a wax composition consisting essentially of from about 1% to about 6% by weight of a paraffin hydrocarbon wax of crystalline structure having a melting point between about 165° F. and about 195° F. between about 1% and about 10% by weight of a polymeric olefin having an average molecular weight greater than about 5,000 and at least 60% by weight of a paraffin hydrocarbon wax having a melting point between about 130° F. and about 145° F.

5. As a new composition of matter, a wax composition consisting essentially of between about 2% and about 5% by weight of a paraffin hydrocarbon wax of crystalline structure having a melting point between about 170° F. and about 195° F. between about 2% and about 5% by weight of polyethylene having a molecular weight greater than about 5,000 and at least 80% by weight of a paraffin hydrocarbon wax having a melting point between about 130° F. and about 145° F.

6. As a new composition of matter, about 2% by weight of paraffin hydrocarbon wax having a melting point of about 175° F., about 3% by weight of polyethylene having a molecular weight of about 12,000, about 60% by weight of a paraffin hydrocarbon wax having a melting point of about 139° F. and about 35% by weight of microcrystalline hydrocarbon wax having a melting point of about 145° F., said composition being substantially free from paraffin waxes having melting points between 150° F. and 165° F.

7. As a new composition of matter, a wax composition consisting essentially of between about 1% and about 6% by weight of a paraffin hydrocarbon wax of crystalline structure having a melting point between about 165° F. and about 195° F. between about 2% and about 5% by weight of polyethylene having a molecular weight of about 5,000, less than about 5% by weight of the reaction product of a base exchange clay and a quaternary ammonium compound and at least 80% by weight of a paraffin hydrocarbon wax of crystalline structure having a melting point between about 130° F. and about 145° F.

8. As a new composition of matter, a wax composition consisting essentially of between about 1% and about 6% by weight of a paraffin hydrocarbon wax having a melting point between about 165° F. and about 195° F. between about 2% and about 5% by weight of polyethylene having a molecular weight greater than about 5,000, less than about 5% by weight of a microcrystalline hydrocarbon wax and at least 80% by weight of a paraffin hydrocarbon wax having a crystalline structure and a melting point between about 130° F. and about 145° F.

9. As a new composition of matter, a wax composition consisting essentially of between about 1% and about 6% by weight of a paraffin hydrocarbon wax of crystalline structure having a melting point between about 170° F. and about 195° F. between about 2% and about 5% by weight of polyethylene having a molecular weight greater than about 5,000, less than about 5% by weight of a soap of an amphoteric metal with a higher fatty acid containing at least 12 carbon atoms per molecule and at least 80% by weight of a paraffin hydrocarbon wax of crystalline structure having a melting point between about 130° F. and about 145° F.

10. As a new composition of matter, a wax composition consisting essentially of between about 1% and about 6% by weight of a paraffin hydrocarbon wax of crystalline structure having a melting point between about 165° F. and about 195° F. between about 2% and about 5% by weight of polyethylene having a molecular weight of at least 5,000, less than about 5% by weight of an inorganic amorphous colloid, at least 80% of the surface of said colloid bearing at least a mono-molecular coating of a hydrophobic surface-active agent of the group consisting of amines, acids and soaps, and at least 80% of said composition of a paraffin hydrocarbon wax having a melting point between about 130° F. and about 145° F.

11. A composition according to claim 1 containing in addition up to about 35% by weight of a microcrystalline hydrocarbon wax.

References Cited in the file of this patent

UNITED STATES PATENTS

| | | |
|---|---|---|
| 2,361,582 | Adams et al. | Oct. 31, 1944 |
| 2,443,221 | Bergstein | June 15, 1948 |
| 2,559,398 | Capell | July 3, 1951 |
| 2,582,037 | Hyde | Jan. 8, 1952 |

OTHER REFERENCES

The Chemistry and Technology of Waxes, Warth, Reinhold Pub. Co., N. Y., 1947, pages 437–444.

Commercial Waxes, Bennett, Chemical Pub. Co., Brooklyn, N. Y., 1944, pages 55 and 56.